United States Patent [19]

Korenblit

[11] Patent Number: 5,125,792
[45] Date of Patent: Jun. 30, 1992

[54] PUMP STUFFING BOX WITH HEAT EXCHANGE DEVICE

[75] Inventor: Izya Korenblit, Cincinnati, Ohio
[73] Assignee: ITT Corporation, New York, N.Y.
[21] Appl. No.: 582,304
[22] Filed: Sep. 14, 1990
[51] Int. Cl.$^5$ .............................................. F01D 11/00
[52] U.S. Cl. .................................. 415/112; 415/110; 415/170.1
[58] Field of Search ............ 415/110, 111, 112, 170.1, 415/229, 230, 231, 180; 277/3, 5, 159, 25

[56] References Cited

U.S. PATENT DOCUMENTS

| 879,484 | 2/1908 | Morterud. | |
|---|---|---|---|
| 1,552,666 | 9/1925 | Banbury. | |
| 1,986,706 | 1/1935 | Beyer. | |
| 2,003,168 | 5/1935 | Allen | 415/170.1 |
| 2,109,679 | 3/1938 | Neveling, Sr.. | |
| 2,543,615 | 2/1951 | Trumpler. | |
| 3,213,798 | 10/1965 | Carswell | 415/175 |
| 3,392,910 | 7/1968 | Tanzberger. | |
| 3,474,734 | 10/1969 | Stogner | 415/230 |
| 3,558,238 | 1/1971 | Herpt | 415/112 |
| 4,109,920 | 8/1978 | Wiese | 415/112 |
| 4,224,008 | 9/1980 | Haentjens | 415/229 |
| 4,543,038 | 9/1985 | Kitaguchi | 415/112 |
| 4,684,318 | 8/1987 | Mulders | 415/110 |

FOREIGN PATENT DOCUMENTS

| 100503 | 8/1979 | Japan | 415/111 |
|---|---|---|---|
| 48795 | 3/1983 | Japan | 415/110 |
| 138223 | 8/1983 | Japan | 415/180 |
| 1060810 | 12/1983 | U.S.S.R. | 415/112 |

OTHER PUBLICATIONS

FIGS. 1-6 Stuffing Box Casting with Cored Passage.
FIG. 7 Separate Cooling CNamber Bolted to Stuffing Box.

Primary Examiner—Edward K. Look
Assistant Examiner—Therese M. Newholm
Attorney, Agent, or Firm—Menotti J. Lombardi

[57] ABSTRACT

A heat exchange device for pump stuffing box in which cooling liquid enters the inlet of the stuffing box, cools it and then enters seal chamber as a lubricant. Only one inlet and outlet port is necessary to provide flow for cooling and lubrication of the stuffing box and seal chamber.

7 Claims, 4 Drawing Sheets

PUMP STUFFING BOX WITH HEAT EXCHANGE DEVICE

BACKGROUND OF THE INVENTION

The invention relates to a pump stuffing box and more particularly to a pump stuffing box with heat exchange device.

Pumps used in high temperature applications have the problem of maintaining sufficient cooling of the stuffing box with mechanical seals. Also for high pressure applications excessive tightening of the gland in pumps with a packing seal causes an increase in heat. To improve the life of the seals in these difficult types of service, the pumps are usually provided with cooling jackets on the stuffing box. The cooling medium removes heat from the stuffing box chamber generated by friction created in the stuffing box. In some applications, a jacketed stuffing box is used as a heater.

Two basic type cooling stuffing box designs are commonly used. The first type provides a cored passage in the stuffing box casting. The second type provides a separate cooling chamber bolted to the stuffing box. Both types have relatively low efficiency and require a high flow rate of cooling medium. These types of jackets require two separate in and out connections for the cooling and sealing mediums. Accordingly, the limitations provided in the prior art designs are overcome by the apparatus of the invention.

SUMMARY OF THE INVENTION

An object of the invention is to provide an improved heat exchange device for a pump stuffing box.

According to the broader aspects of the invention a pump stuffing box with a seal arrangement includes means to permit a cooling liquid to enter the inlet part of the stuffing box to cool it and then enter the seal chamber as a lubricant. One inlet and outlet port is included to provide fluid flow for cooling and lubrication of the stuffing box and seal chamber.

A feature of the invention is that the inside surface of the heat exchange device represents the outside surface of the seal chamber to provide high effective cooling action.

A further feature of the invention is that a spiral channel of the heat exchange device provides additional cooling effect.

BRIEF DESCRIPTION OF THE DRAWINGS

Other objects, features and advantages of the present invention will become more apparent from the following detailed description of the preferred embodiment, the appended claims and the accompanying drawings in which:

DETAILED DESCRIPTION OF THE PREFERRED EMBODIMENTS

Figure 1:
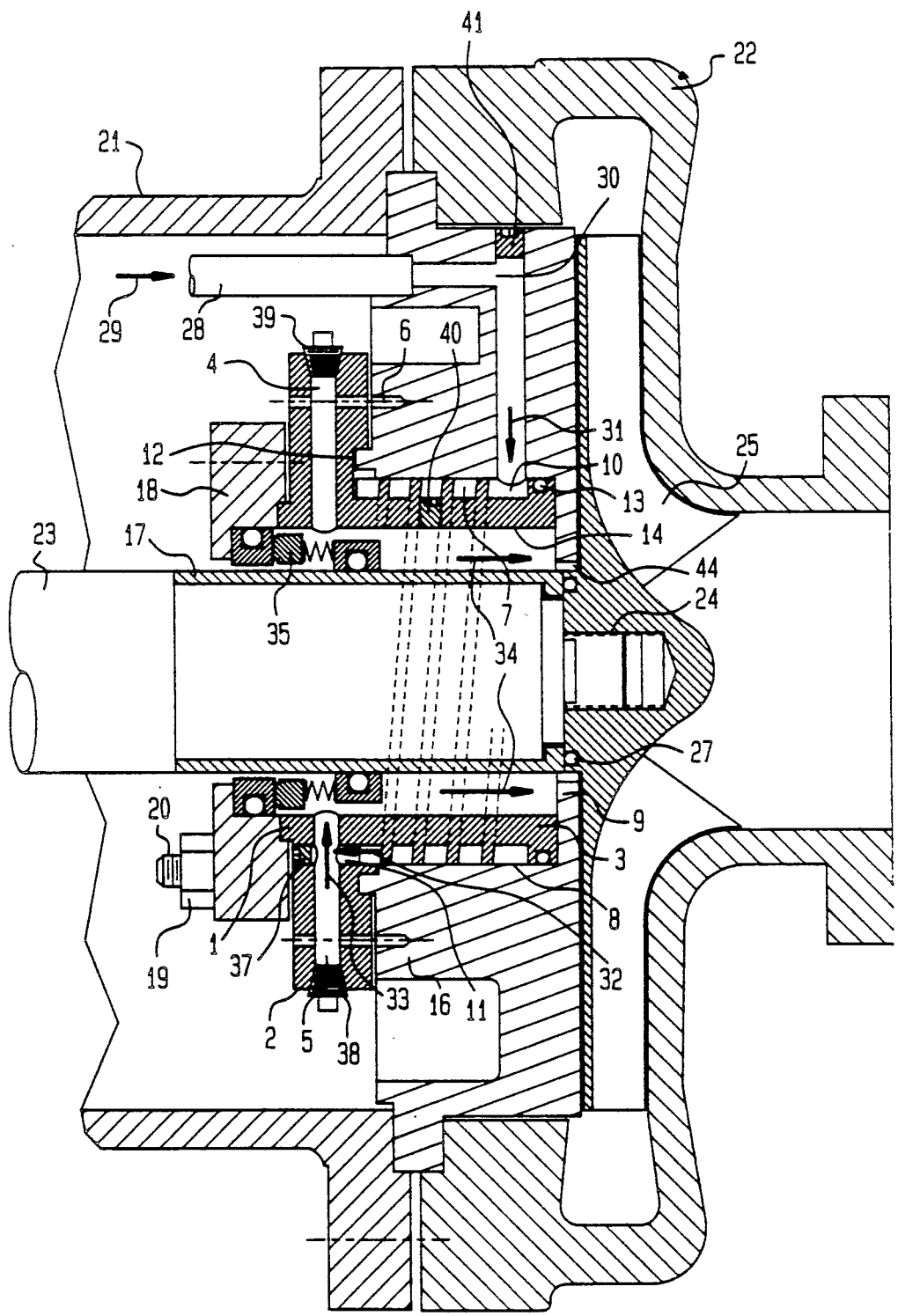
FIG. 1 is a sectional view of an embodiment of the invention with a single type mechanical seal.

Referring initially to FIG. 1, the pump stuffing box with heat exchange device and single type mechanical seal is illustrated. Insert 1 has a flange portion 2 and a bushing portion 3. Flange portion 2 has radial holes 4,5 and a number of axial holes 6 through which it is bolted to the stuffing box 16. Bushing portion 3 has a spiral groove 7 which, together with inside surface 8 of stuffing box 16, forms a spiral heat exchanger.

The spiral heat exchanger is provided with an entrance port 10 and an exit port 11. A gasket 12 is positioned between flange portion 2 and stuffing box 16. An o-ring 13 positioned in bushing portion 3 is effective with gasket 12 to seal the heat exchanger. The inside surface 14 of bushing portion 3 and the outside surface of shaft sleeve 17 mounted on shaft 23 form the top and bottom of the seal chamber area.

A gland 18 is mounted to flange portion 2 by means of gland nut 19 and stud 20, and completes the seal chamber area with the flange portion 9 of stuffing box 16. Pump frame 21 is bolted to pump casing 22 by means of studs and nuts in a known manner. Shaft 23 is threaded 24 for mounting of impeller 25. O-ring 27 seals the impeller against shaft sleeve 17. A pipe 28 is mounted to stuffing box 16 to couple a cooling fluid supplied in direction of arrow 29 into channel 30 in stuffing box 16. The cooling fluid flows in direction of arrow 31 into entrance port 10 around spiral channel 7 to exit in direction of arrow 32 at exit port 11. The fluid continues in direction of arrow 33, passes through the seal chamber in direction of arrows 34 and then into pump casing through spacing 44 between the hub of impeller 25 and stuffing box flange 9.

A single mechanical seal 35 is positioned with the seal chamber. Plug elements 37-41 are also shown and control the permitted direction of flow for the cooling fluid to enable one type insert and stuffing box to be used with various mechanical seals as will become evident with reference to the other embodiments. Once the cooling fluid enters port 10 of the heat exchanger formed by the insert 1 and stuffing box 16, it flows through the formed spiral channels 7, exits port 11 and flows through the seal chamber to lubricate the mechanical seal and then is discharged through space 44 to mix with the pumping liquid.

Figure 2:
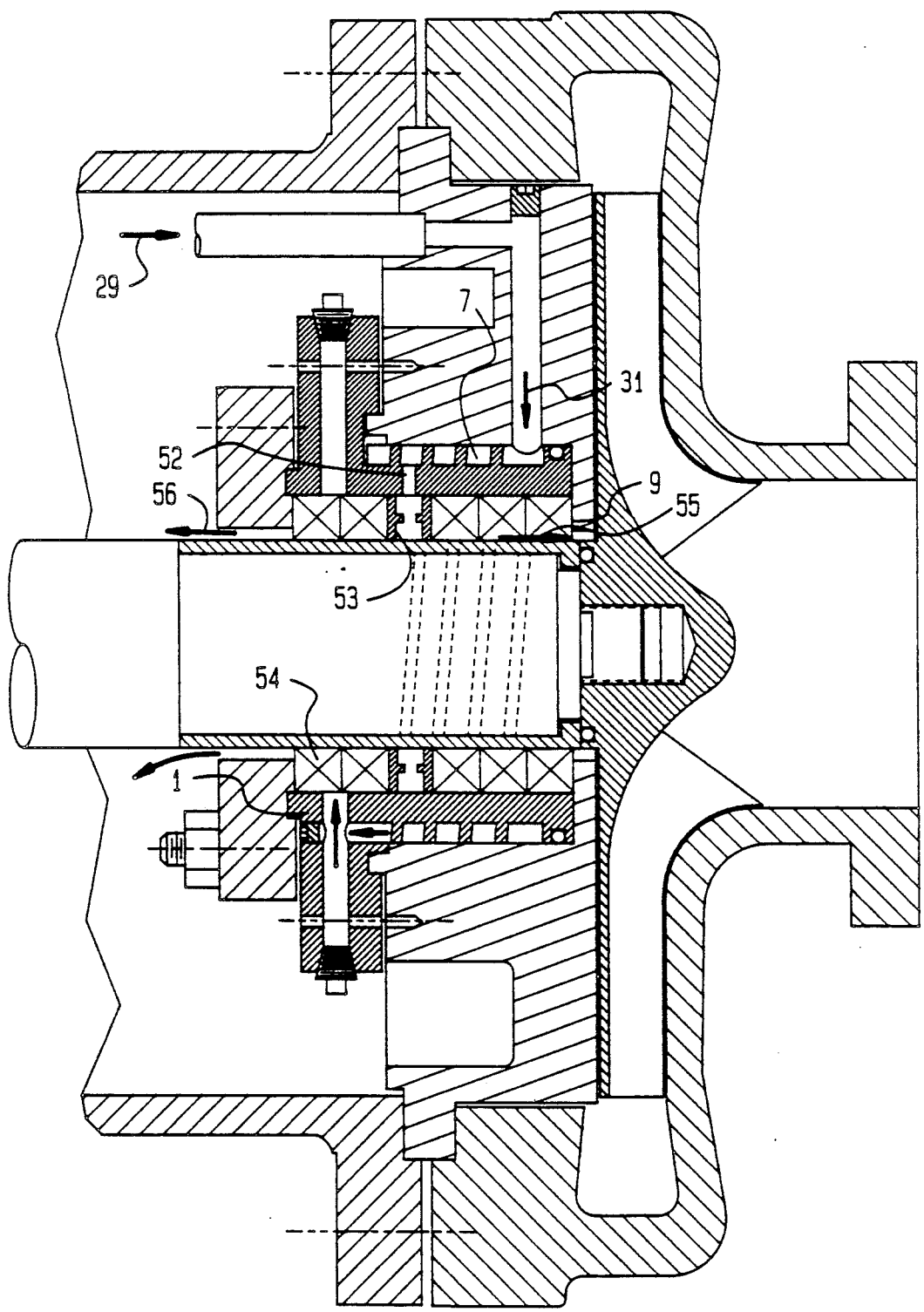
FIG. 2 is a sectional view of en embodiment of the invention with a packing arrangement.

Referring next to FIG. 2, the embodiment of the heat exchanger for a pump with a packing seal is illustrated. Only those parts which are different or differently utilized from those shown in FIG. 1 are referenced in the drawing. The insert 1 in this embodiment has plug 40 removed to provide a port 52, below which is located a lantern ring 53. On either side of ring 53 are packing seals 54. The flange portion 9 of the stuffing box 16 is the location of the maximum heat which is generated due to the slight difference in pressure between the lubricant fluid and the bottom of the stuffing box. This area of the seal chamber thus requires the most cooling.

As the cooling fluid flows in the direction of arrows 29,31 it flows through spiral channel 7, enters the ring 53 at port 52 to lubricate the packing seals 54, and exits at arrows 55 and 56.

Figure 3:
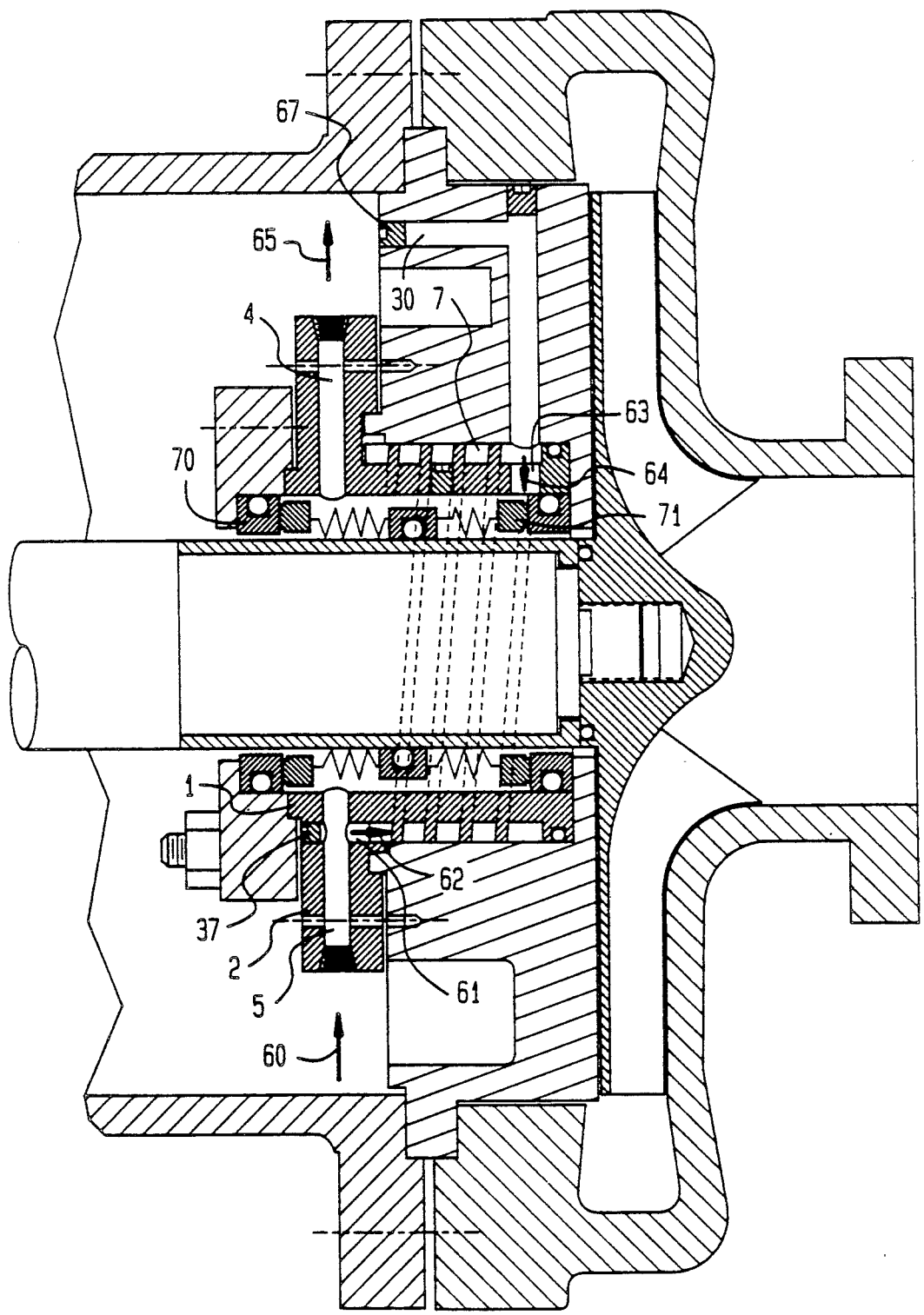
FIG. 3 is a sectional view of an embodiment of the invention with a double type of mechanical seal.

FIG. 3 illustrates the embodiment of the heat changer for a pump with a double mechanical seal. Only those parts which are different or differently utilized from those shown in FIG. 1 are referenced in the drawing. Cooling fluid enters in direction of arrow 60 into channel 5 in flange portion 2 of insert 1. The fluid exits channel 5 at port 61 in direction of arrow 62 and flows through spiral channels 7 to enter the seal chamber at port 63 in direction of arrow 64. Double mechanical seals 70,71 are positioned within the seal chamber. The cooling fluid which entered port 63 flows through the seal chamber and exists through channel 4 in direction of arrow 65. In this embodiment, fluid tubing would be connected to channels 4 and 5, plugs 38,39 removed and plug 67 inserted in stuffing box channel 30.

Figure 4:
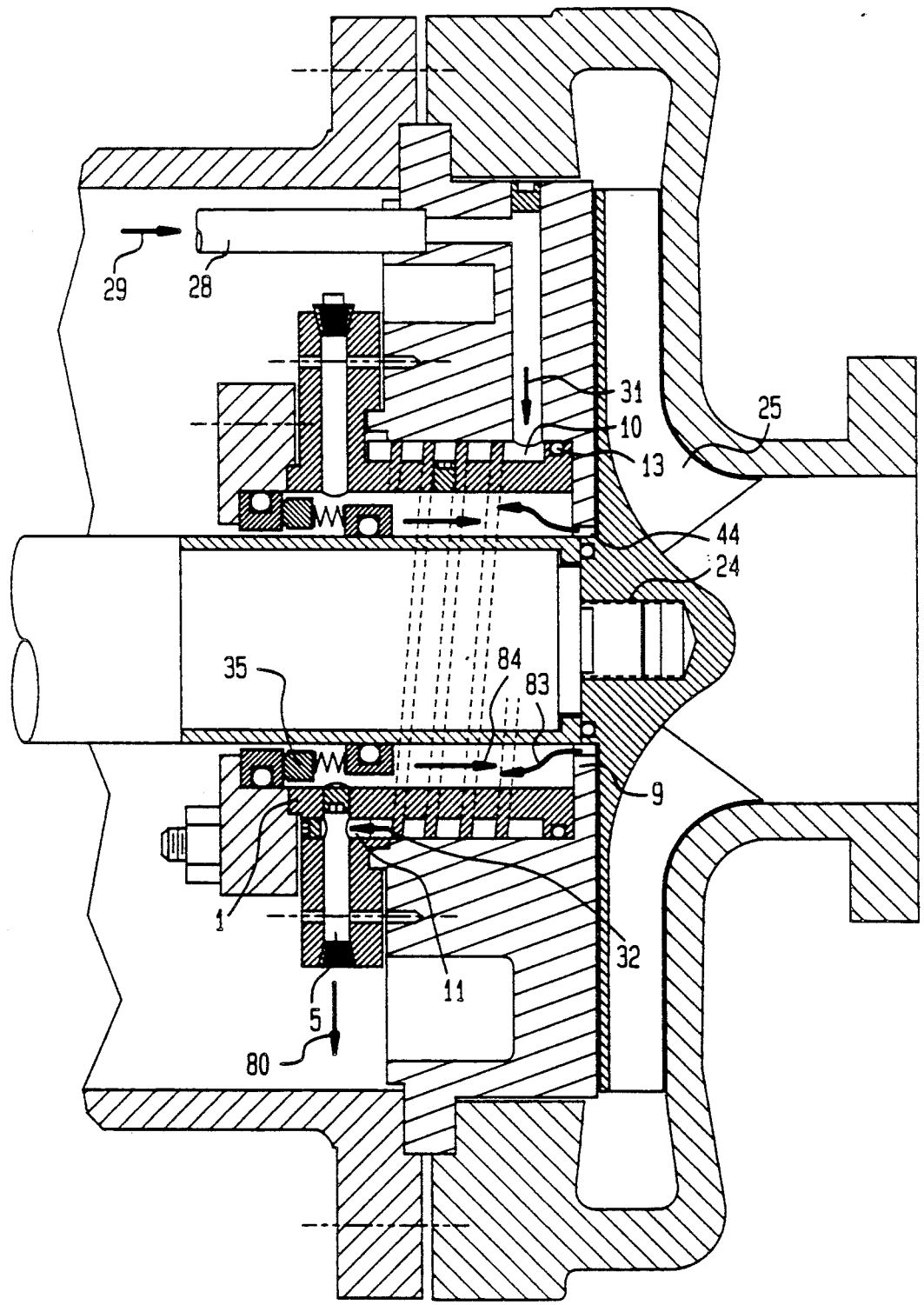
FIG. 4 is a sectional view of an embodiment of the invention with a single mechanical seal in which the seal is lubricated by the pumping liquid.

FIG. 4 illustrates the embodiment of the heat exchanger for a pump with a single mechanical seal lubricated by the pumping liquid. Only those parts which are different or differently utilized from FIG. 1 are referenced in the drawing. As in FIG. 1, the cooling fluid enters pipe 28 in direction of arrow 29 and continues in direction of arrow 31 to port 10. The fluid flows through spiral channel 7 and exits at port 11 in direction of arrow 32 through channel 5 in direction of arrow 80. Plug 38 has been removed and a pipe would be connected to channel 5 in this embodiment. Additionally, mechanical seal 35 would be lubricated by circulation of the pumping liquid. The pumping liquid would enter and exit in the space 44 between the hub of impeller 25 and flange 9 the stuffing box in direction of arrows 83,84.

It should be understood that by using a different combination of inlet and out ports in the novel heat exchange arrangement, various types of mechanical seals can be utilized. It should also be understood that there may be other embodiments which fall within the scope of the invention as defined by the following claims.

I claim:

1. Pump apparatus comprising:
   a stuffing box mounted between a pump frame and pump casing, said stuffing box having a cylindrical inside surface portion:
   an insert having a flange portion and a bushing portion mounted to said stuffing box;
   said bushing portion having a plurality of grooves which with said stuffing box surface portion form to a spiral heat exchanger;
   a pump shaft and sleeve centrally positioned within said insert, and the outer surface of said sleeve and the inner surface of said bushing portion forming a seal chamber area;
   means coupling a cooling fluid to said spiral heat exchanger for cooling said seal chamber area;
   a gland mounted to the flange portion of said insert, and said gland and a flange end of said stuffing box axially limiting said seal chamber area;
   mechanical seal means positioned with said seal chamber;
   an impeller mounted on said shaft within the interior of said casing;
   pipe means coupled to said stuffing box, and said stuffing box having a channel therein in fluid connection with said pipe;
   an entrance and exit port in said insert to permit cooling fluid flow through said spiral heat exchanger and through said seal chamber;
   said flange portion of said insert includes radial holes, and said entrance port is in fluid connection with said stuffing box channel; and
   seal means between said stuffing box and insert to effect sealing of said spiral heat exchanger, and wherein the cooling fluid exits said seal chamber area in a space formed between said flange end of said stuffing box adjacent said impeller and a hub surface of said impeller.

2. The apparatus of claim 1 including plug means for selectively closing said holes in said insert to direct said cooling fluid flow.

3. In combination:
   a pump casing;
   a pump frame for mounting said casing;
   a stuffing box mounted between said casing and frame, said stuffing boxing separating the interior of said casing from the interior of said frame, and said stuffing box having a central hole therethrough and a cylindrical inside surface portion larger than and concentric with said hole;
   a pump shaft extending through said central hole and having an impeller mounted thereon within the interior of said casing and adjacent said stuffing box;
   an insert having a bushing portion with spiral ribs being mounted within said cylindrical inside surface portion of said stuffing box and forming with said surface a spiral heat exchanger;
   a shaft sleeve mounted on said shaft and defining with an inner surface of said bushing portion a seal chamber area;
   means for coupling a cooling fluid to said spiral heat exchanger for cooling said seal chamber area;
   a gland mounted to the flange portion of said insert, and mechanical seal means positioned with said seal chamber area;
   channel means in said stuffing box in fluid connection with said spiral heat exchanger;
   an entrance and exit port in said insert to permit cooling fluid flow through said spiral heat exchanger and through said seal chamber area to lubricate said mechanical seal means; and wherein the cooling fluid exits said seal chamber area in a space formed between a flange end of said stuffing box adjacent said impeller and a hub surface of said impeller.

4. In Combination:
   a pump casing;
   a pump frame for mounting said casing;
   a stuffing box mounted between said casing frame, said stuffing boxing separating the interior of said casing from the interior of said frame, and said stuffing box having a central hole therethrough and a cylindrical inside surface portion larger than and concentric with said hole;
   a pump shaft extending through said central hole and having an impeller mounted thereon within the interior of said casing and adjacent said stuffing box;
   an insert having a bushing portion with spiral ribs being mounted within said cylindrical inside surface of said stuffing box, and the peripheral portions of said ribs being in contact with said cylindrical inside surface and forming with said surface a spiral heat exchanger;
   a shaft sleeve mounted on said shaft and defining with an inner surface of said bushing portion a seal chamber area;
   means for coupling a cooling fluid to said spiral heat exchanger;
   said stuffing box having a channel and said insert having an entrance port in fluid connection with said channel;
   mechanical seal means located within said seal chamber; and said insert having an exit port to permit said cooling fluid to lubricate said mechanical seal.

5. The combination of claim 4 including a lantern ring positioned on said sleeve adjacent said exit port.

6. In combination:
a pump casing;
a pump frame for mounting said casing;
a stuffing box mounted between said casing frame, said stuffing boxing separating the interior of said casing from the interior of said frame, and said stuffing box having a central hole therethrough and a cylindrical inside surface portion larger than and concentric with said hole;
a pump shaft extending through said central hole and having an impeller mounted thereon within the interior of said casing and adjacent said stuffing box;
an insert having a bushing portion with spiral ribs being mounted within said cylindrical inside surface of said stuffing box, and the peripheral portions of said ribs being in contact with said cylindrical inside surface and forming with said surface a spiral heat exchanger;
a shaft sleeve mounted on said shaft and defining with an inner surface of said bushing portion a seal chamber area;
means including a channel in said stuffing box for coupling a cooling fluid to said spiral heat exchanger; and
said insert including a flange portion with a hole therein in fluid connection with said spiral heat exchange to convey said cooling fluid away from said heat exchanger.

7. The combination of claim 6 including mechanical seal means positioned within said seal chamber area; and
said seal chamber area being lubricated by the pumping fluid being permitted to flow through a space formed between a flange end of said stuffing box adjacent said impeller and a hub surface of said impeller.

* * * * *